(12) United States Patent
Reuter et al.

(10) Patent No.: US 7,219,595 B2
(45) Date of Patent: May 22, 2007

(54) MASTER CYLINDER HOUSING

(75) Inventors: David F. Reuter, Beavercreek, OH (US); Frank G. Pirrello, Dayton, OH (US); Alfred Carl Vennemeyer, Englewood, OH (US); Mark D. Burns, Miamisburg, OH (US)

(73) Assignee: Delphi Technologies, Inc., Troy, MI (US)

( * ) Notice: Subject to any disclaimer, the term of this patent is extended or adjusted under 35 U.S.C. 154(b) by 64 days.

(21) Appl. No.: 11/089,202

(22) Filed: Mar. 24, 2005

(65) Prior Publication Data

US 2005/0247193 A1   Nov. 10, 2005

Related U.S. Application Data

(60) Provisional application No. 60/555,887, filed on Mar. 24, 2004.

(51) Int. Cl.
*F16J 10/04* (2006.01)
(52) U.S. Cl. ................................................. 92/171.1
(58) Field of Classification Search ................ 92/171.1
See application file for complete search history.

(56) References Cited

U.S. PATENT DOCUMENTS

| | | | | | |
|---|---|---|---|---|---|
| 3,156,097 | A | * | 11/1964 | Brown ........................ | 60/588 |
| 4,771,605 | A | * | 9/1988 | Kytta ........................... | 60/589 |
| 4,941,323 | A | * | 7/1990 | Leigh-Monstevens ........ | 60/589 |

\* cited by examiner

*Primary Examiner*—F. Daniel Lopez
(74) *Attorney, Agent, or Firm*—Scott A. McBrain

(57) ABSTRACT

A master cylinder housing including an outer shell having an open end and a closed end, a polymeric inner lining received within the outer shell, and a mounting flange extending from the open end of the outer shell.

16 Claims, 14 Drawing Sheets

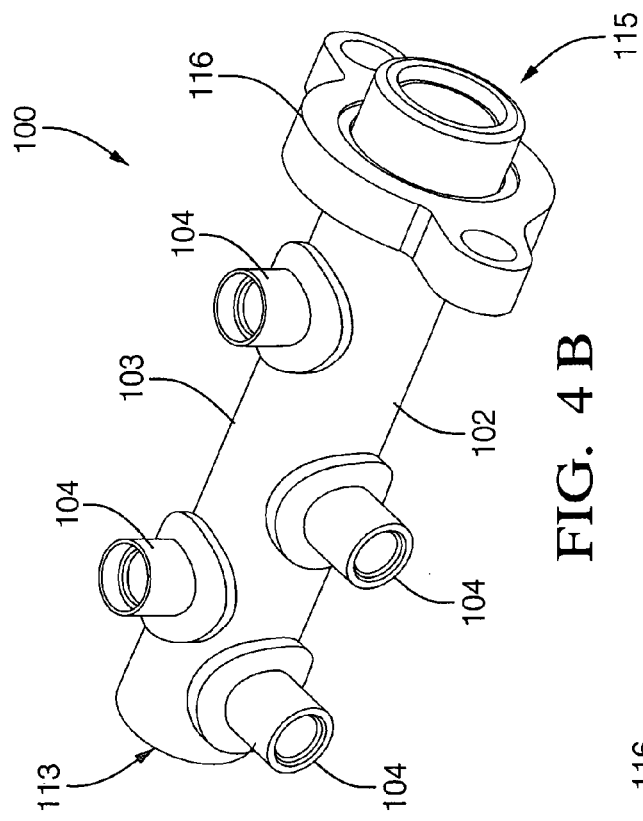
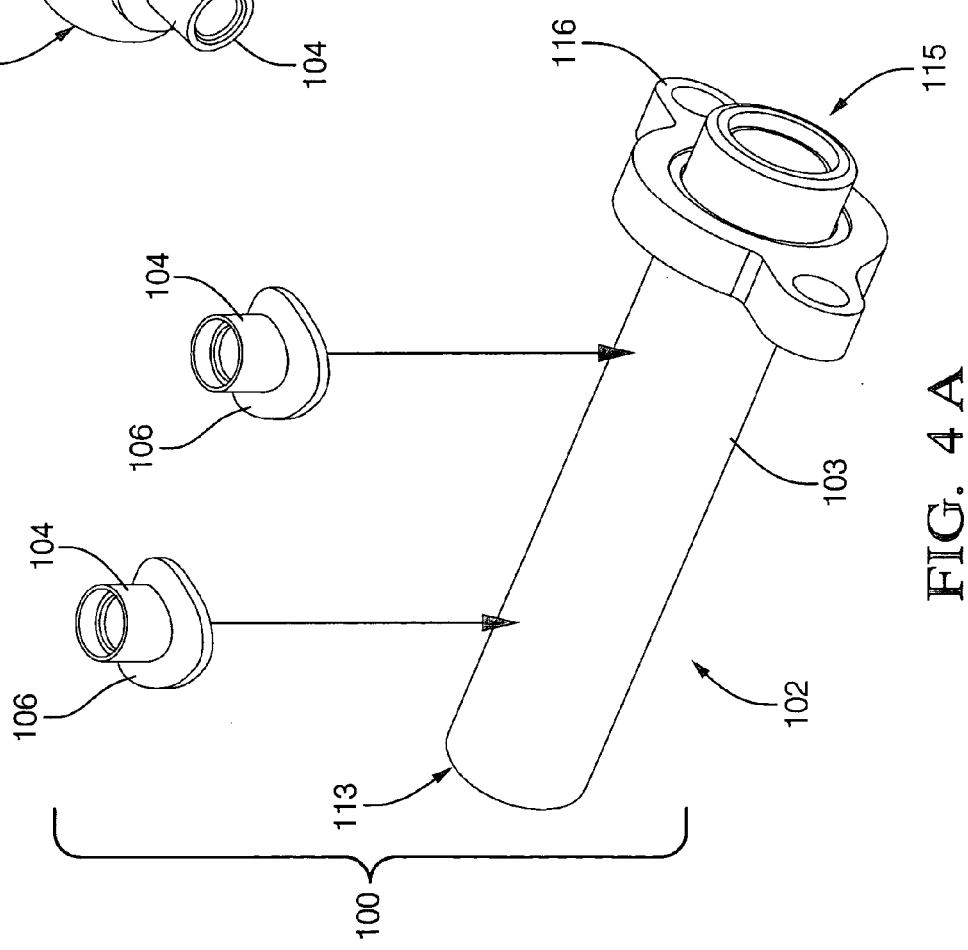

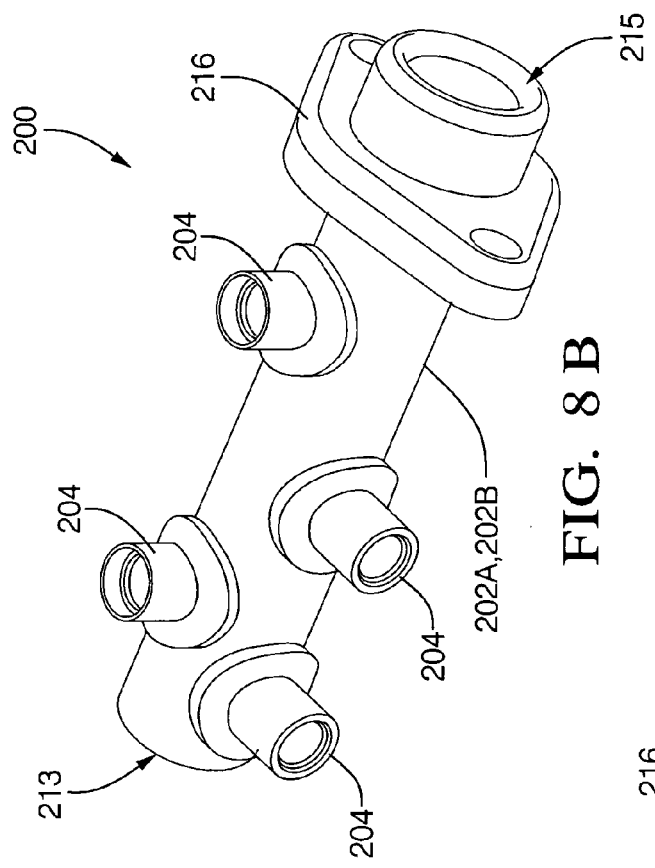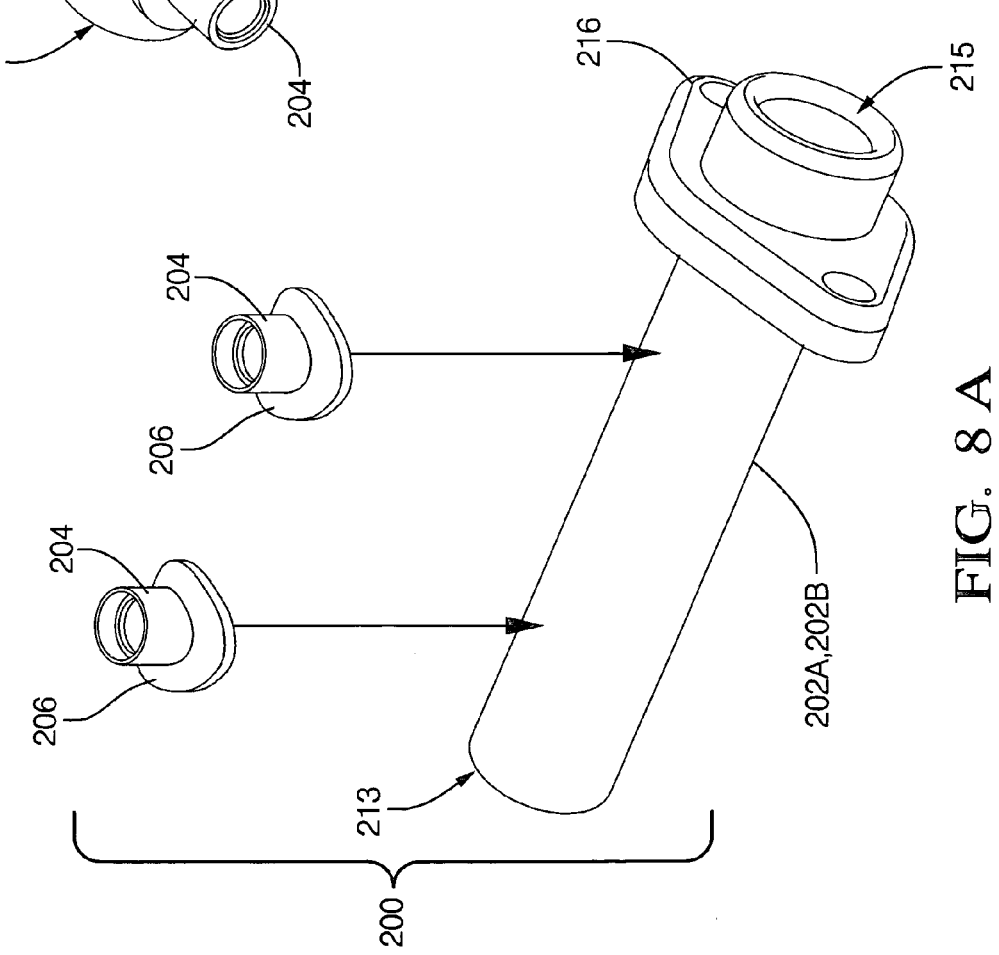
FIG. 8B
FIG. 8A

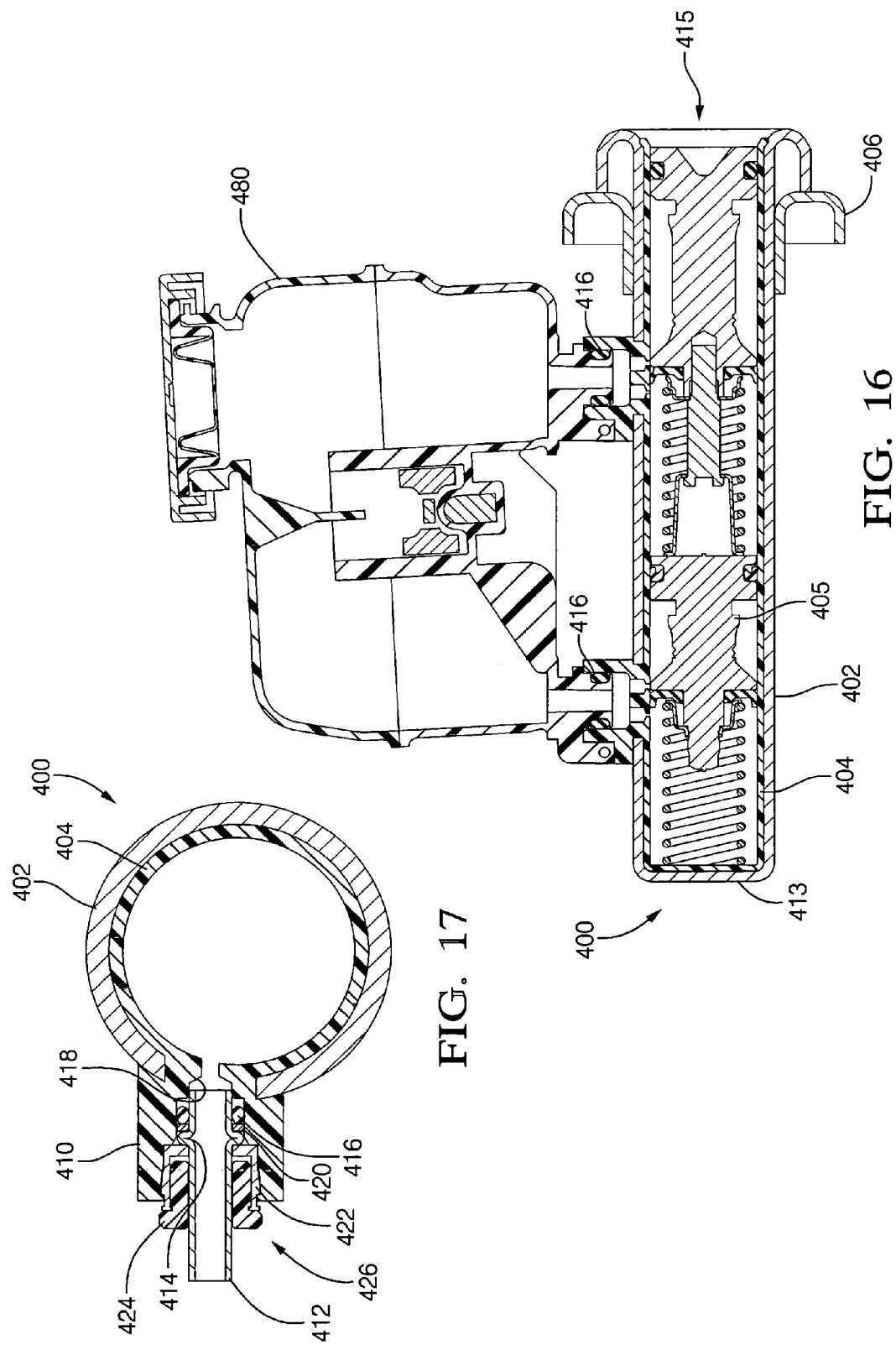

MASTER CYLINDER HOUSING

This application claims priority from U.S. Provisional Patent App. No. 60/555,887 filed on Mar. 24, 2004, the entire contents of which are incorporated herein by reference.

BACKGROUND

This invention relates to master cylinders that are used with vehicle braking systems and, more particularly, to housings for master cylinders.

To increase safety, most modern automobile braking systems are comprised of two hydraulic circuits, with two wheels connected to each circuit. If a fluid leak occurs in one circuit, only two of the four wheels of the vehicle will lose their braking ability, enabling the vehicle to stop when the driver presses on the brake pedal.

A key component of the dual-circuit hydraulic braking system is the master cylinder. The master cylinder supplies hydraulic pressure to both circuits of the vehicle, and is comprised of two pistons within a common master cylinder housing. When the driver presses the brake pedal, a linkage coupled to the brake pedal pushes on a primary piston of the master cylinder. Pressure builds in the master cylinder, and in a first braking circuit coupled to the master cylinder, as the brake pedal is depressed. Hydraulic pressure also builds between the primary piston and a secondary piston, displacing the secondary piston and causing the secondary piston to compress fluid in a second braking circuit. The hydraulic pressure in both braking circuits is transmitted to brake devices on each wheel of the vehicle, causing the brake devices to engage a rotating portion of the wheels. The resulting friction between the brake devices and the rotating portion of the wheels acts to slow or stop the vehicle.

Proper operation of the braking system depends on the integrity of the hydraulic system. The master cylinder must be capable of generating several hundred pounds per square inch of hydraulic fluid pressure and the entire braking system must maintain this pressure without leaking. Thus, a master cylinder housing is preferably made of robust, high-strength materials. However, there is a conflicting design constraint wherein it is desirable to make the master cylinder housing as light as possible to keep the vehicle's weight down. Yet another conflicting design constraint is a desire to produce an inexpensive master cylinder housing to keep down the manufacturing cost of the vehicle.

Accordingly, there is a need for a relatively lightweight, robust master cylinder housing that is relatively inexpensive to produce.

SUMMARY

A first aspect of the master cylinder housing includes an outer shell having an open end and a closed end, a polymeric inner lining received within the outer shell and a mounting flange extending from the open end of the outer shell.

A second aspect of the master cylinder housing includes an outer shell having a first end, a second end and a generally cylindrical body, the generally cylindrical body defining at least one opening therein, and a polymeric inner liner received within the outer shell, the inner liner having at least one fitting extending therefrom, wherein the inner lining is connected to the outer shell such that the fitting extends radially from the opening in the outer shell.

In a third aspect, a method for constructing a master cylinder housing from an outer shell and a mounting flange is provided. The method includes the steps of insert molding a polymeric inner lining to an inner portion of the outer shell, the inner lining including at least one reservoir fitting and at least one brake line fitting, and connecting the mounting flange to the outer shell.

In another aspect, the master cylinder housing includes a hydroformed aluminum outer shell. An inner tube made of drawn steel is placed within the outer shell, then the inner tube is pierced with openings for hydraulic fluid ingress and egress. A mounting flange made by a cold-heading process is swaged to the inner tube and outer shell to provide a mounting point for the master cylinder housing.

In another aspect, the master cylinder housing includes an impact-extruded aluminum core piece and machined and formed aluminum fittings. The fittings are coupled to the core piece by annular deformation resistance welding to form a welded composite aluminum master cylinder housing.

In another aspect, the master cylinder housing includes a drawn tube core piece made of steel or aluminum and a plurality of machined and formed steel or aluminum fittings. The fittings are coupled to the core piece by an annular deformation resistance welding process to form a welded composite steel or welded composite aluminum master cylinder housing.

In another aspect, the master cylinder housing includes an impact-extruded body. The body is machined as needed to accommodate master cylinder components and mounting of the master cylinder housing. A relatively thin, bulge-formed outer shell is placed over the body. Fittings and/or other components, such as a reservoir, are coupled to the body by staking the fittings and components to the outer shell.

In another aspect, the master cylinder housing includes an O-ring, a backup washer, a brake pipe with a flare, a primary snap-in retainer and a secondary snap-in locking retainer.

Other aspects of the master cylinder housing will be apparent from the following description, the accompanying drawings and the appended claims.

BRIEF DESCRIPTION OF THE DRAWINGS

FIG. 4A is an exploded, perspective view of a second aspect of the master cylinder housing;

FIG. 4B is a front perspective view of the master cylinder housing of FIG. 4A;

FIG. 8A is an exploded, perspective view of a third aspect of the master cylinder housing;

FIG. 8B is a front perspective view of the master cylinder housing of FIG. 8A;

FIG. 16 is a front elevational view, in section, of the master cylinder housing of FIG. 13, including a reservoir;

FIG. 17 is a side elevational view, in section, of the master cylinder housing of FIG. 13.

DETAILED DESCRIPTION

Figure 1:
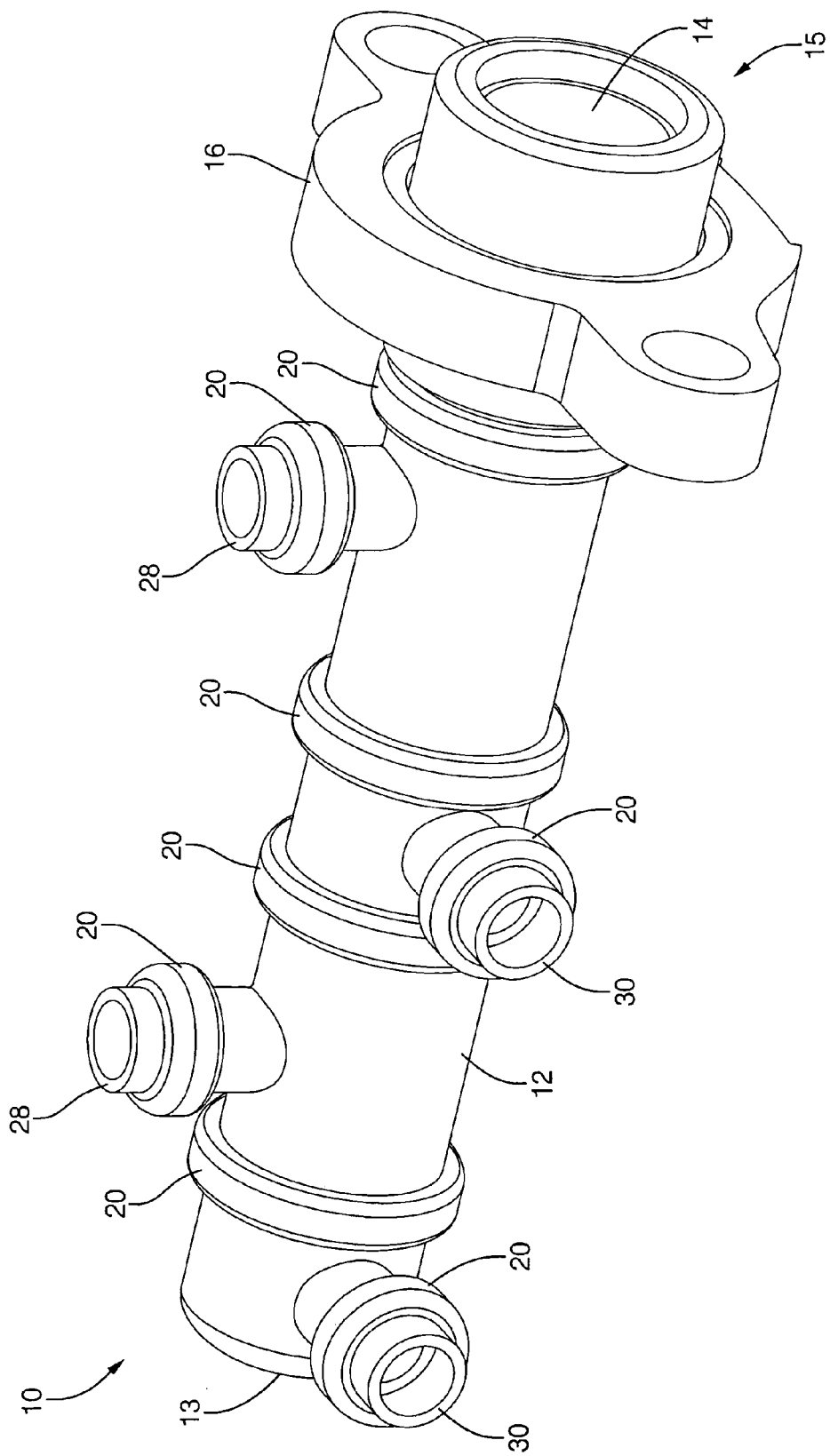
FIG. 1 is a front perspective view of a first aspect of the master cylinder housing.
Figure 2:
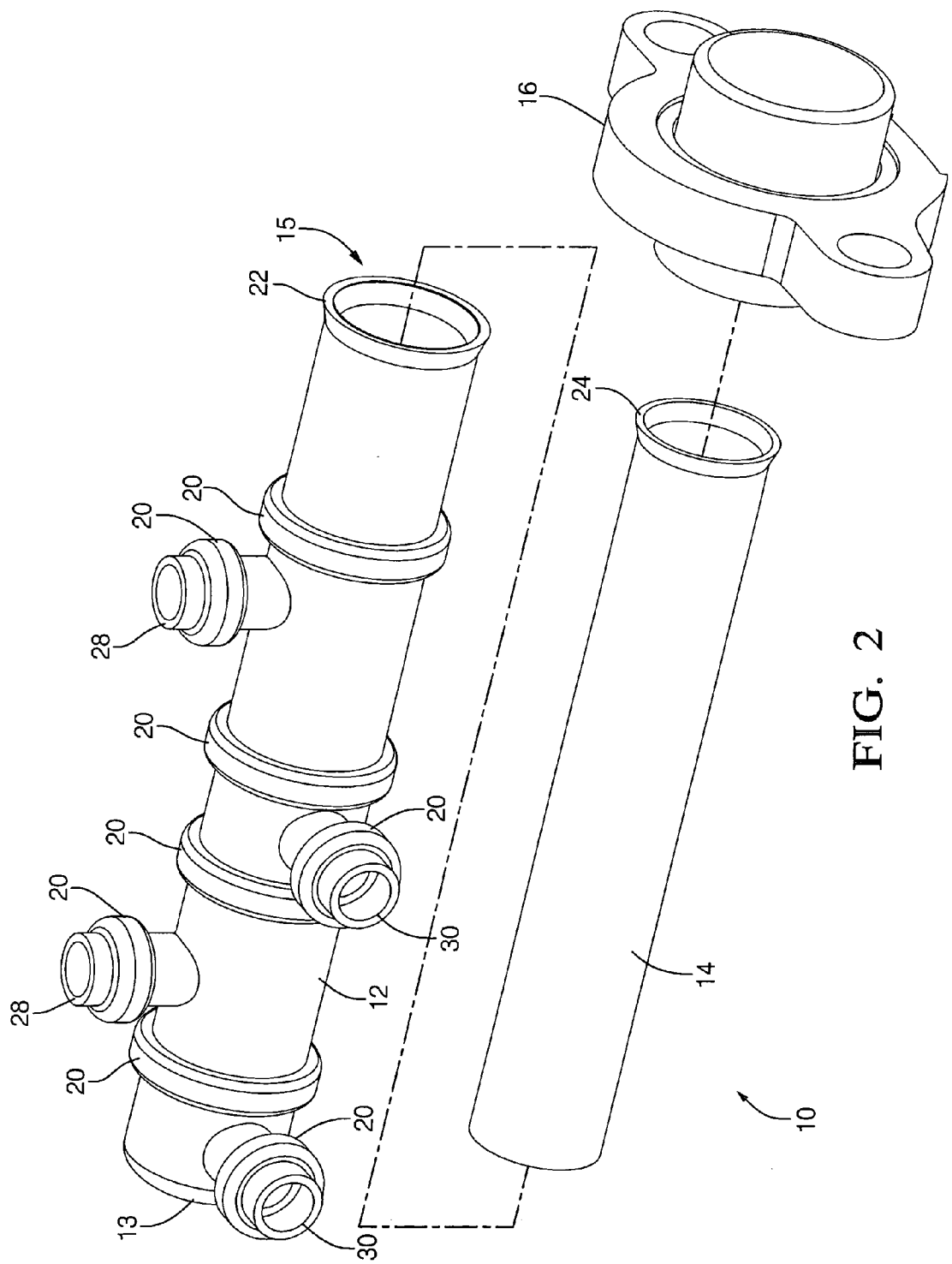
FIG. 2 is an exploded, perspective view of the master cylinder housing of FIG. 1.
Figure 3:
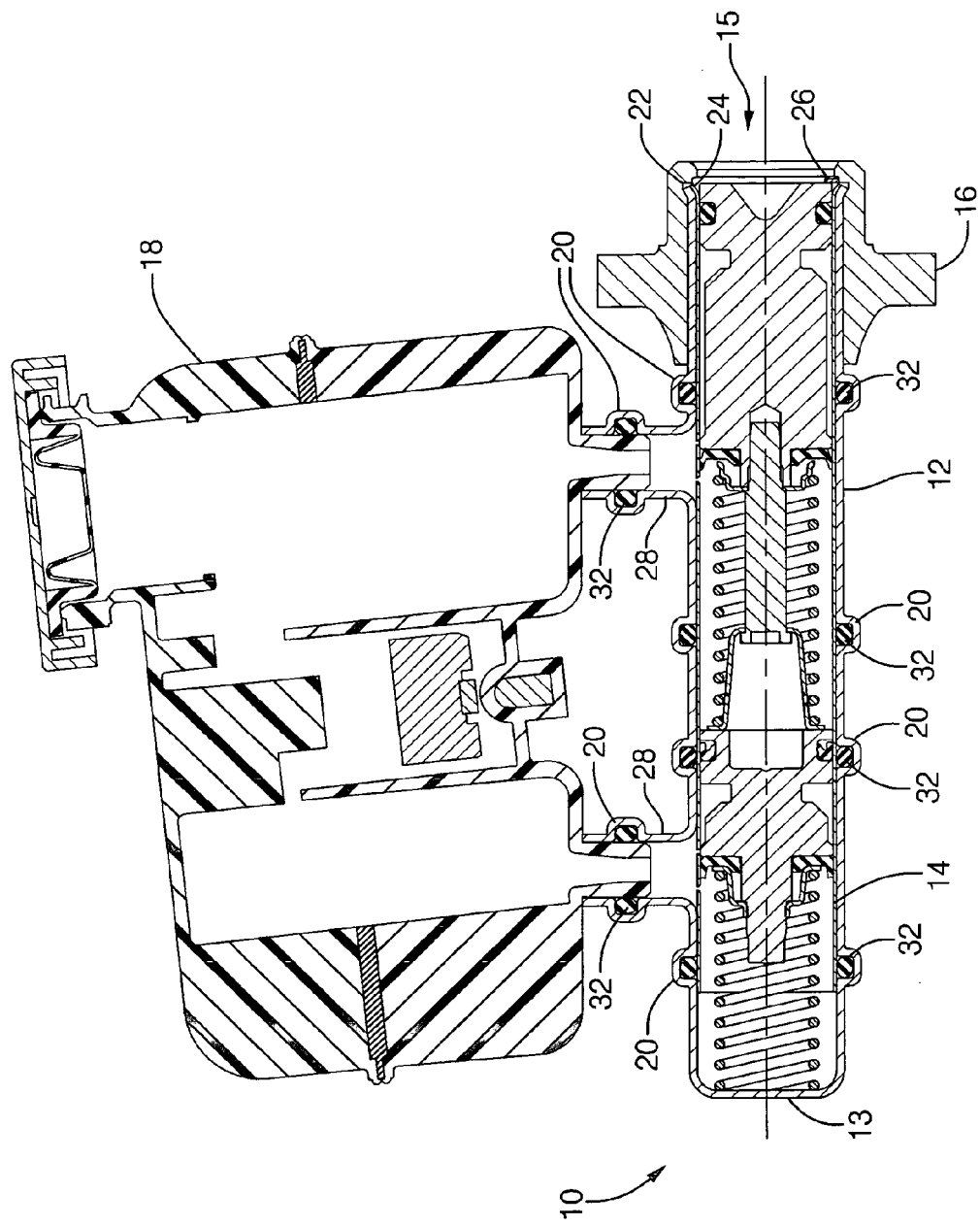
FIG. 3 is a side elevational view, in section, of the master cylinder housing of FIG. 1 with an attached reservoir.

As shown in FIGS. 1-3, a first aspect of the master cylinder housing, generally designated 10, includes an outer shell 12, an inner tube 14 and a mounting flange 16. A reservoir 18 may be coupled to the master cylinder housing 10 (see FIG. 3).

The outer shell 12 may be made from an aluminum alloy suitable for use with hydraulic brake systems. Outer shell 12 may be hydroformed by any conventional process to a shape as generally shown in FIGS. 1-3, having a closed end 13 and an open end 15. A typical hydroforming process uses fluid pressure in place of a punch used with a conventional tool set to form outer shell 12 into a predetermined shape in accordance with the shape of a die. Hydroforming allows the manufacture of a one-piece outer shell 12 that would otherwise need to be made from multiple stampings mechanically joined together. Considerable weight savings are possible through the elimination of flanges that would be required for joining of stampings, such as by welding. Further weight savings may be obtained by using thinner material than would typically be required for welded components. Thus, the rigidity and burst strength may be maintained due, in part, to the elimination of discontinuous spot-welded joints.

Outer shell 12 may further include integrally formed O-ring grooves 20 to facilitate the installation of a plurality of O-rings 32. O-rings 32 serve to seal portions of master cylinder housing 10 and to provide fluid-tight connections for at least one reservoir fitting 28, as well as at least one brake line fitting 30. Outer shell 12 may also include a swaged edge 22, formed by any conventional swaging process.

Inner tube 14 may be a drawn steel tube, such as a cold-drawn tube. Cold drawing forms inner tube 14 from a pre-rolled or pre-drawn condition into a secondary or final shape by pulling it through at least one precision draw die (not shown). Cold drawing may be used to form precision geometric shapes with tight dimensional tolerances from numerous grades of metal alloys, such as high and low carbon steel, stainless steel, brass, copper, bronze, and aluminum. Cold drawing of inner tube 14 may require several stages of drawing to achieve a final shape, which may be of machined quality. Cold drawing is cost-effective for producing complex, tight tolerance components. Inner tube 14 may further include a swaged edge 24, formed by any conventional swaging process.

Mounting flange 16 may be adapted to attach master cylinder housing 10 to a vehicle (not shown). In one aspect, mounting flange 16 may be made from steel, aluminum or various alloys thereof and may be formed by a cold-heading process. The cold-heading process involves placing a predetermined blank piece of material into a die. The blank may then be struck with one or more blows of the die to either upset (i.e., create a bulge in the blank) and/or extrude (i.e., reduce the diameter of the blank), controlling the flow of metal to achieve a finished mounting flange 16. Cold-heading increases the mechanical strength of the material of mounting flange 16 through reconfiguration of the grain flow of the material of the mounting flange. As such, no material is removed from mounting flange 16 during cold-heading, as would be the case with a machining process. Instead, the upsetting and extrusion process of cold-heading will cause the grains of the material of mounting flange 16 to be compacted and the grain flow of the material will be positively altered in critical areas of the mounting flange.

This rearrangement and compacting of the grain flow yields a mounting flange 16 that is resilient to fatigue. A cold-headed mounting flange 16 will also have a higher shear, tensile and yield strengths as compared to mounting flanges made from other processes, such as machining. Multiple station machines may be used to move the blank through a progression of dies rather than attempting to form mounting flange 16 in just a few blows. Cold-heading has a high degree of design versatility and is an economical alternative to machining. Other advantages of cold-heading include repeatability, the ability to hold close tolerances and relatively low scrap rates.

As shown best in FIG. 3, master cylinder housing 10 may be assembled by fitting conventional O-rings 32 into grooves 20, then sliding inner tube 14 into outer shell 12. Swaged edges 22, 24 of outer shell 14 and inner tube 16, respectively, may be coupled to an inner lip 26 of mounting flange 16, securely coupling the inner tube and outer shell to the mounting flange to form master cylinder housing 10. After assembly of master cylinder housing 10 is complete, inner tube 14 may be pierced with a plurality of openings (not shown) at the locations of reservoir couplings 28 and brake line couplings 30. The openings may be made by any conventional process, such as drilling, machining and punching. A reservoir 18 may be coupled to reservoir fittings 28 such that O-rings 20 in the reservoir fittings provide a fluid-tight seal between reservoir 18 and master cylinder housing 10.

As shown in FIGS. 4A-7B, a second aspect of the master cylinder housing, generally designated 100, may be formed by a core piece 102 and a plurality of fittings 104.

Core piece 102 may be made of an aluminum alloy compatible with hydraulic braking systems and may include a cylindrical portion 103 and a mounting flange portion 116. Core piece 102 may be formed by cold-heading in the manner described above, then impact-extruded. Impact extrusion is a forming process that produces core piece 102 by striking a cold slug of raw material, such as aluminum alloy, contained in a die cavity (not shown). A predetermined portion of the raw material is placed in the die and is impacted by a ram punch, which causes cold flow in the material. The raw material is forced by a single high speed blow to flow around the punch of the die. Wall thickness of core piece 102 is controlled by the amount of clearance between the punch and the die. The finished core piece 102 may have a closed end 113 and an open end 115. The use of a conventional cold-heading process may reduce or eliminate porosity in core piece 102 by compression of the material during the impact extrusion process. Porosity may result in leakage and failure of the master cylinder housing 100.

With reference to FIGS. 6A-7B, fittings 104 may be made of any alloy of aluminum compatible with hydraulic brake systems and core piece 102. Fittings 104 may be machined and formed from a blank 105 (see FIGS. 6A and 7A) to a final shape 104 (see FIGS. 6B and 7B). Fittings 104 may include a curved flange 106 adapted to fit against a cylindrical portion 103 of core piece 102.

With reference to FIGS. 4A and 4B, fittings 104 may be coupled to core piece 102 by a conventional annular deformation resistance welding ("ADRW") process. Annular deformation resistance welding uses annular or circular electrodes (not shown) to produce a weld that is uniform in strength and leak-tight. The annular electrodes are placed on core piece 102 and flange 106 of a fitting 104. The electrodes then apply heat and pressure to the contact area between flange 106 and cylindrical portion 103 of core piece 102, resistance welding them together to create a leak-tight weld. The electrodes are adapted to promote contact between fitting flange 106 and cylindrical portion 103 during welding, resulting in effective solid-state bonding.

Figure 5:
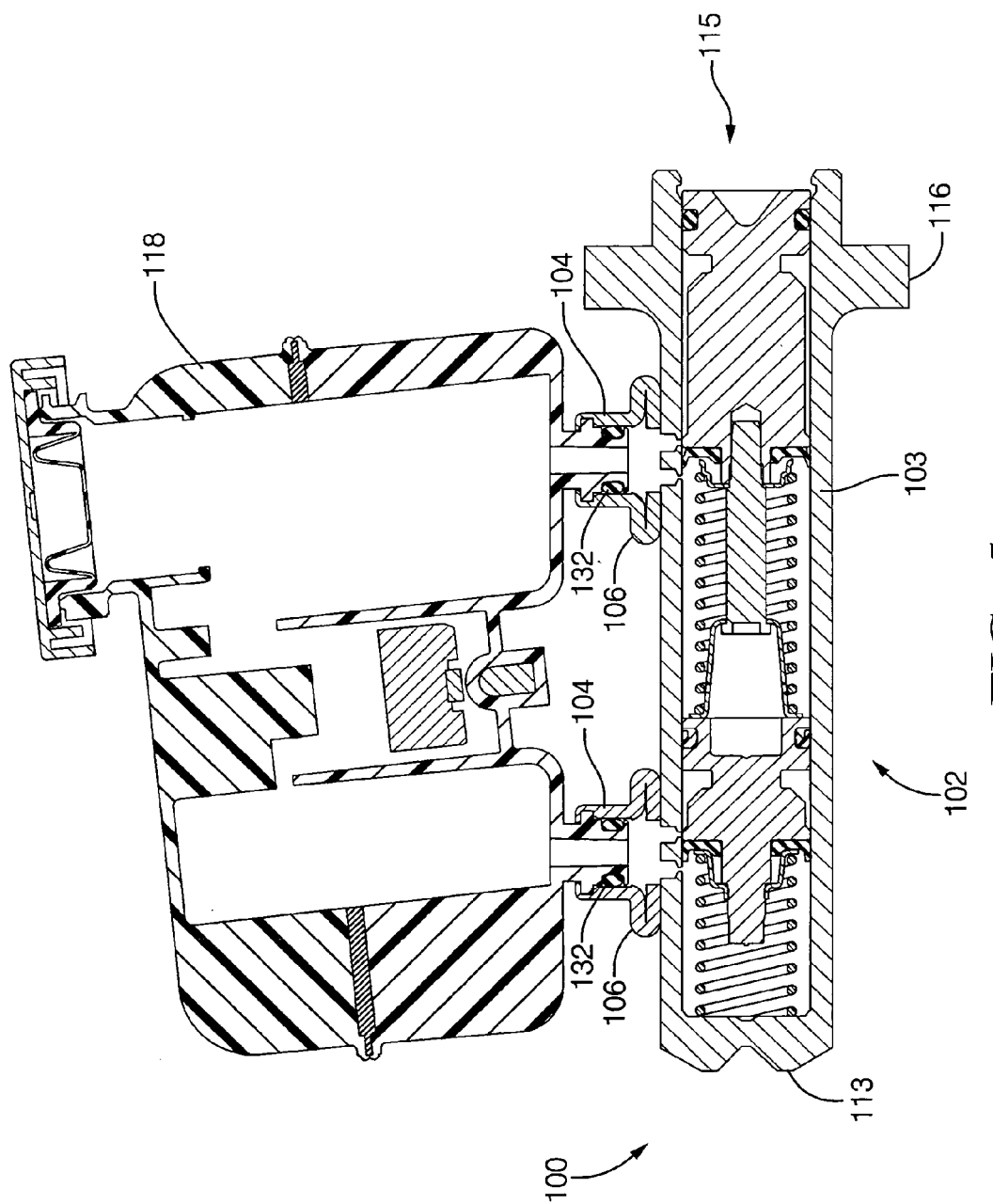
FIG. 5 is a side elevational view, in section, of the master cylinder housing of FIG. 4B with an attached reservoir.
Figure 6:
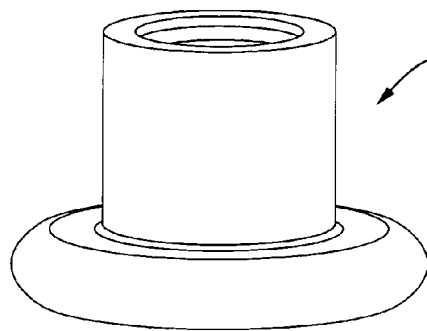
FIG. 6A is a front perspective view of a blank for forming an outlet fitting adapted for use with the master cylinder housing of FIG. 4B.
FIG. 6B is a front elevational view, shown in section, of an outlet fitting formed from the blank of FIG. 6A.
Figure 6:
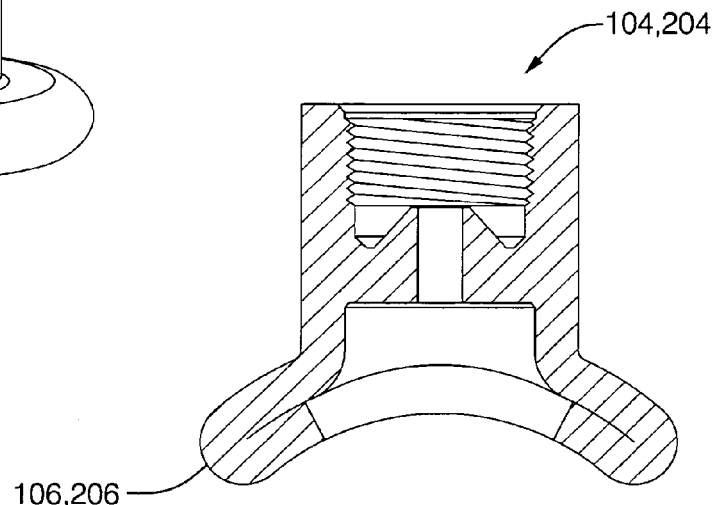
Figure 7:
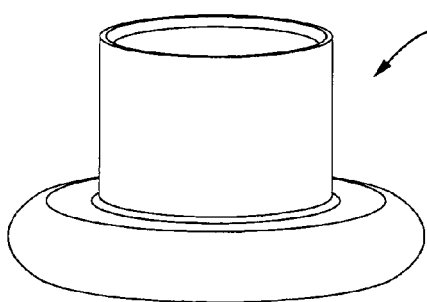
FIG. 7A is a front perspective view of a blank for forming a reservoir fitting adapted for use with the master cylinder housing of FIG. 4B.
FIG. 7B is a front elevational view, shown in section, of a reservoir fitting formed from the blank of FIG. 7A.
Figure 7:
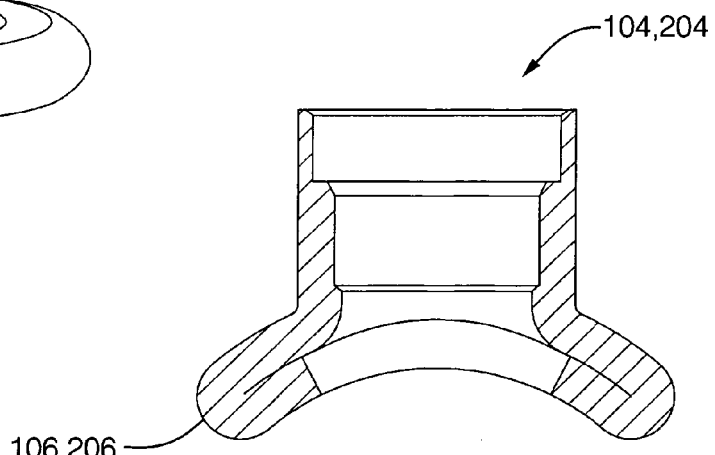

A reservoir 118 may coupled to master cylinder housing 100 by means of fittings 104, as shown in FIG. 5. Fittings 104 may be crimped to reservoir 118 by any conventional crimping means, securing the reservoir to master cylinder housing 100 and forming a fluid-tight seal with a pair of O-rings 132 located in the fittings.

As shown in FIGS. 8A-10, a third aspect of the master cylinder housing, generally designated 200, includes a core piece 202, a plurality of fittings 204 and a mounting flange 216.

Core piece 202 may be made of an aluminum alloy 202A (see FIG. 9) or steel alloy 202B (see FIG. 10) compatible with hydraulic braking systems. Core piece 202A, 202B may be formed by a cold drawing process in the manner described above. Finished core piece 202A, 202B may include a closed end 213 and an open end 215.

Figure 9:
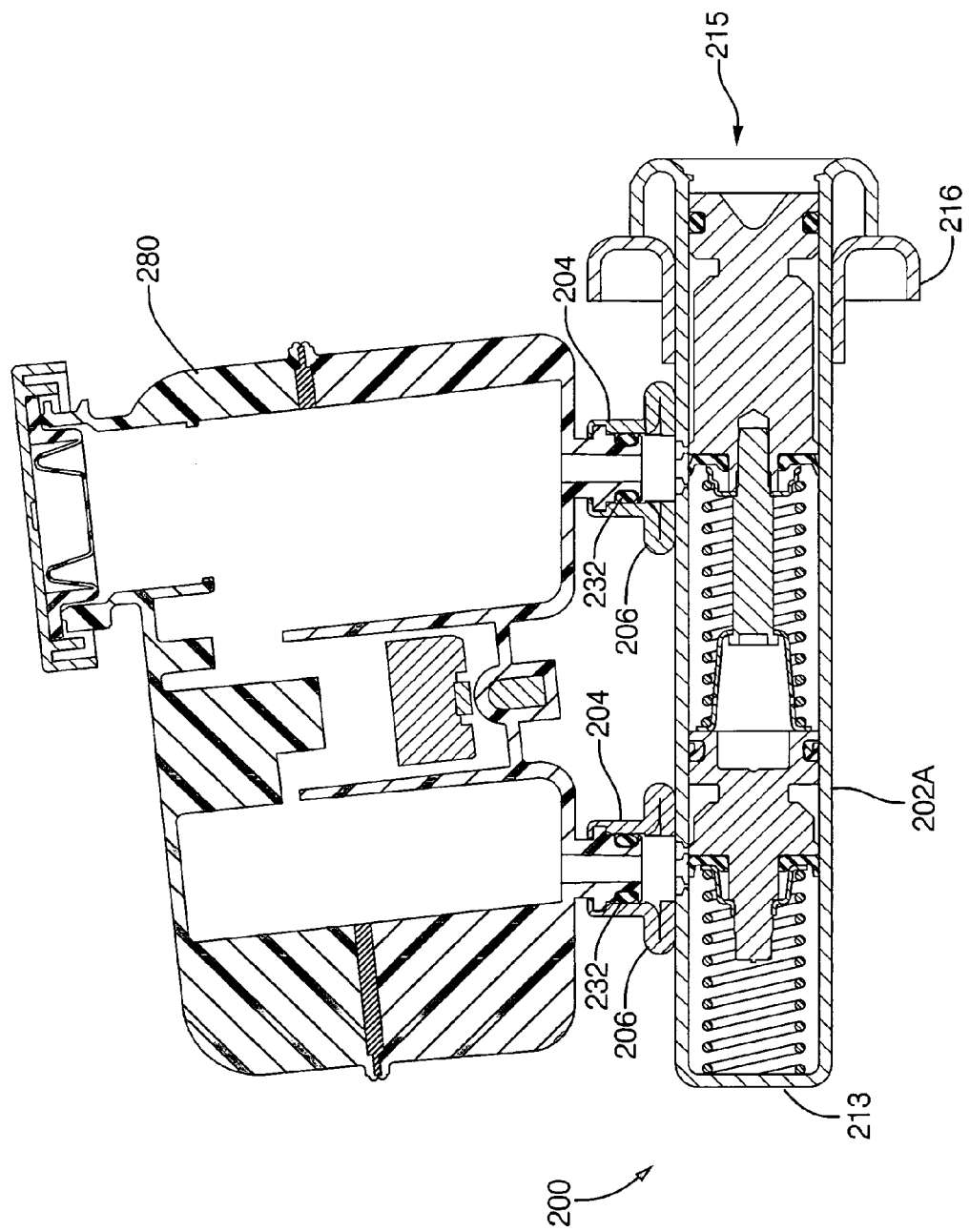
FIG. 9 is a side elevational view, in section, of the master cylinder housing of FIG. 8B with an aluminum body and an attached reservoir.
Figure 10:
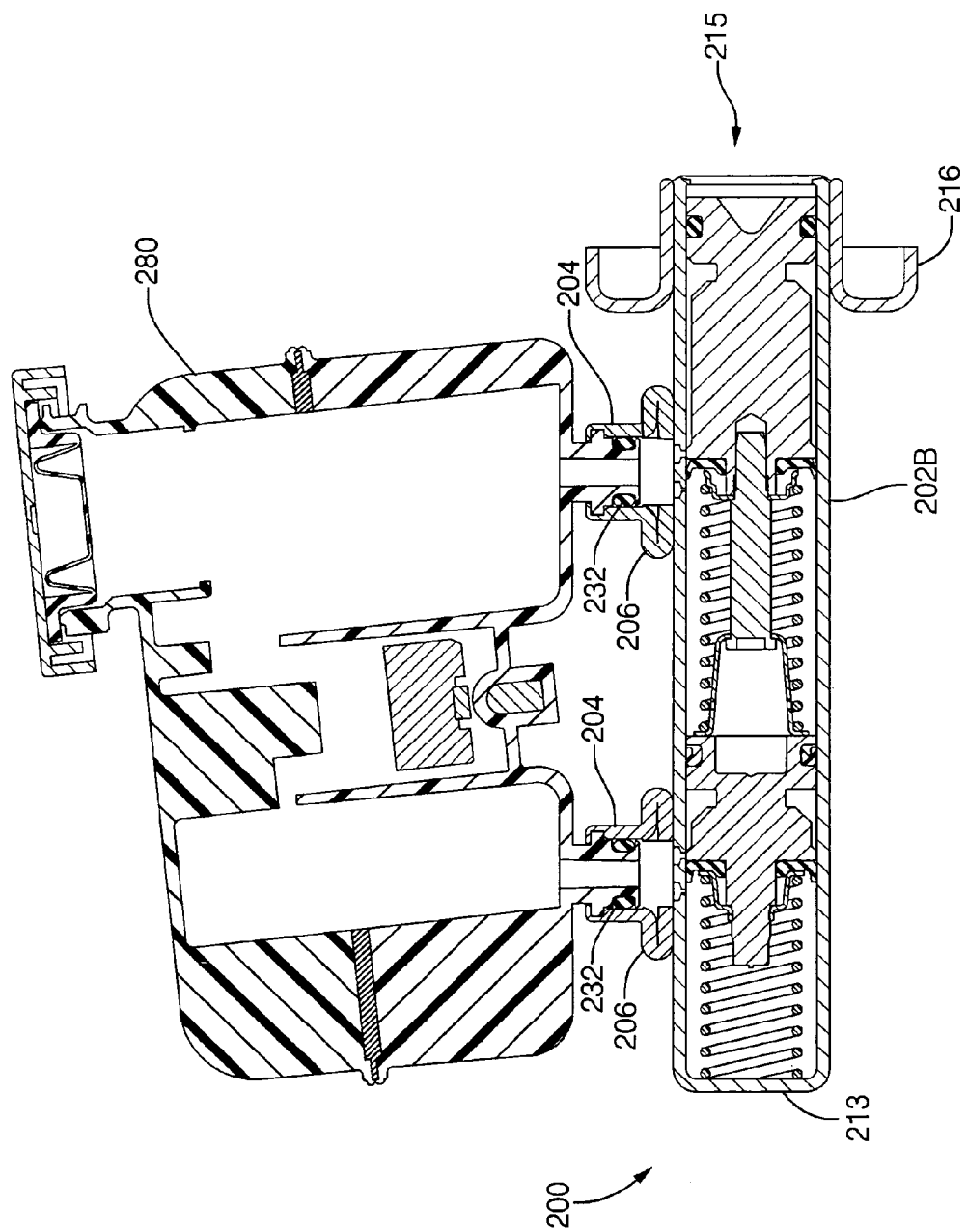
FIG. 10 is a side elevational view, in section, of the master cylinder housing of FIG. 8B with a steel body and an attached reservoir.

With reference to FIGS. 8A, 9 and 10, fittings 204 may be made of any alloy of aluminum or steel compatible with hydraulic brake systems and core piece 202A, 202B. Fittings 204 may be machined and formed from a blank 205 to a final shape, as shown in FIGS. 6A-7B. Fittings 204 may include a curved flange 206 adapted to fit against a curved outer surface of core piece 202.

With reference to FIGS. 8A and 8B, the mounting flange 216 may be made of any material that is compatible with core piece 202A, such as aluminum, or compatible with core piece 202B, such as steel. Mounting flange 216 may be formed to a predetermined shape by any conventional means, such as machining and stamping processes. Mounting flange 216 may coupled to core piece 202A, 202B by any conventional process, such as welding, press fitting or hydroforming.

Master cylinder housing 200 may be assembled using an aluminum core piece 202A and fittings 204 made of aluminum, as shown in FIGS. 8A, 8B and 9. Likewise, master cylinder housing 200 may be assembled using a steel core piece 202B and fittings 204 made of steel, as shown in FIGS. 8A, 8B and 10. In either configuration of this embodiment, flanges 206 of fittings 204 may be coupled to core piece 202A, 202B by any conventional annular deformation resistance welding process as described above. A reservoir 280 may be coupled to a pair of fittings 204 such that a pair of O-rings 232 provide a fluid-tight seal between reservoir 280 and master cylinder housing 200.

Figure 11:
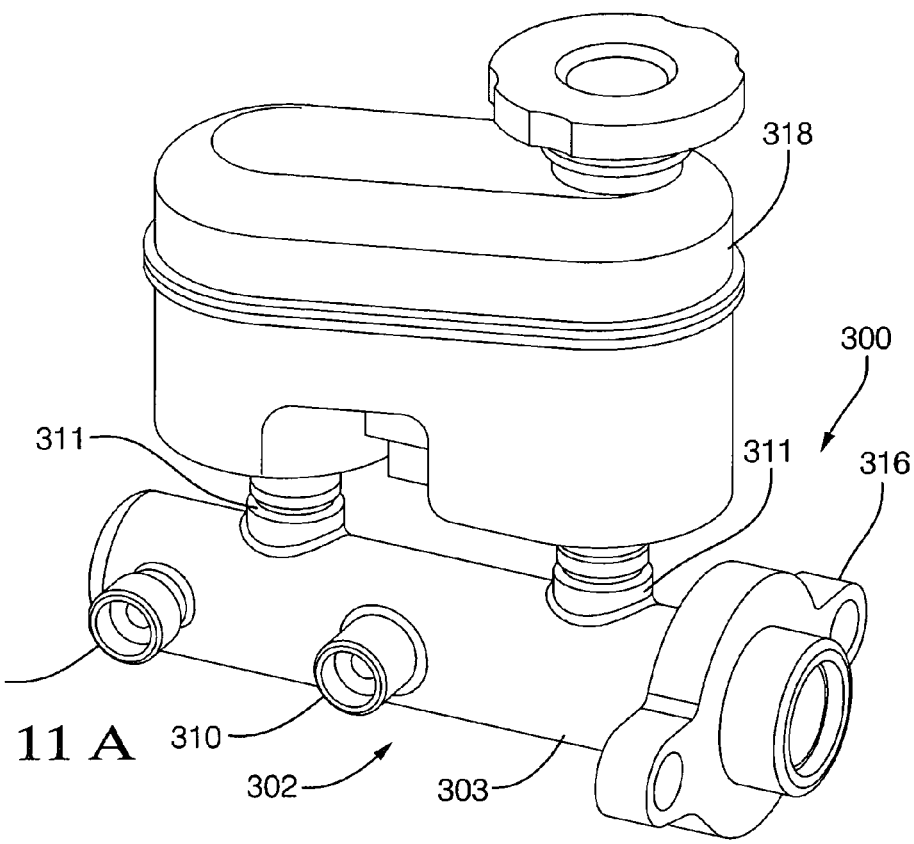
FIG. 11A is a front perspective view of a fourth aspect of the master cylinder housing.
FIG. 11B is a front perspective view of an impact-extruded body of the master cylinder housing of FIG. 11A.
FIG. 11C is a front perspective view of a body formed from the impact-extruded body of FIG. 11B.
Figure 11:
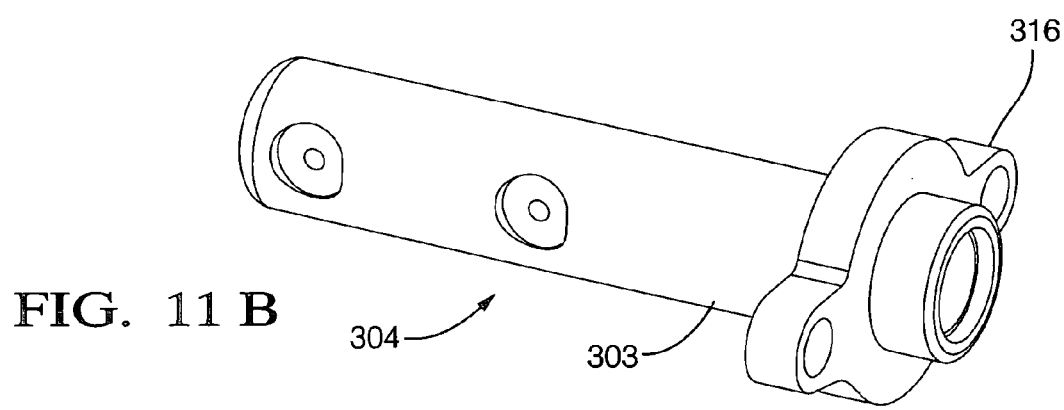
Figure 11:
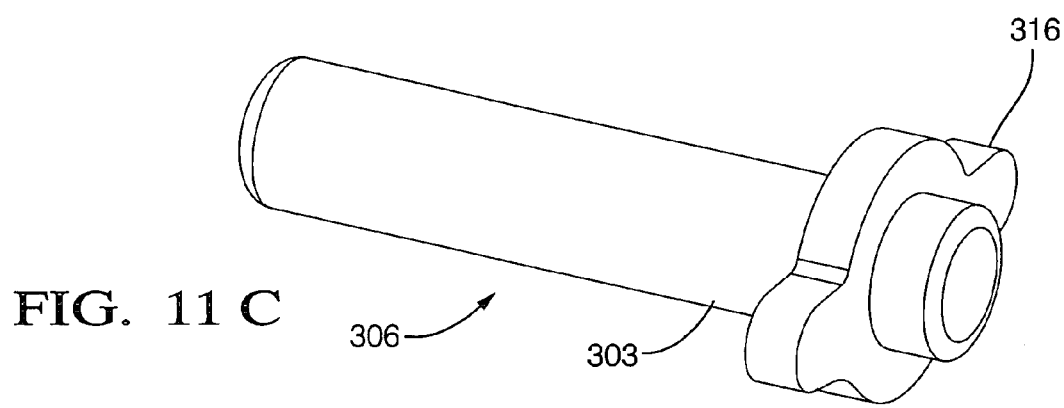
Figure 12:
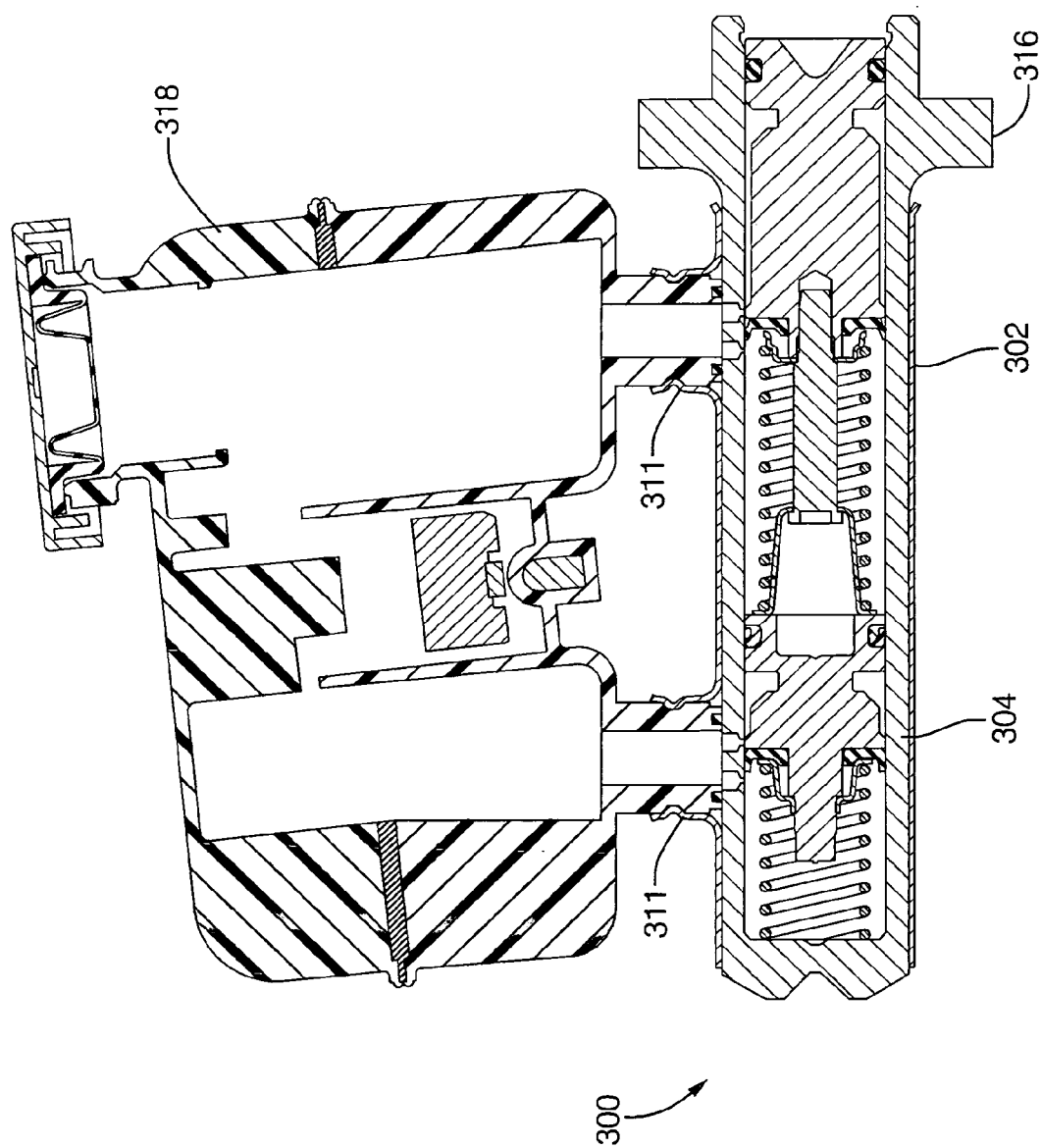
FIG. 12 is a side elevational view, in section, of the master cylinder housing and reservoir of FIG. 11A.
Figure 13:
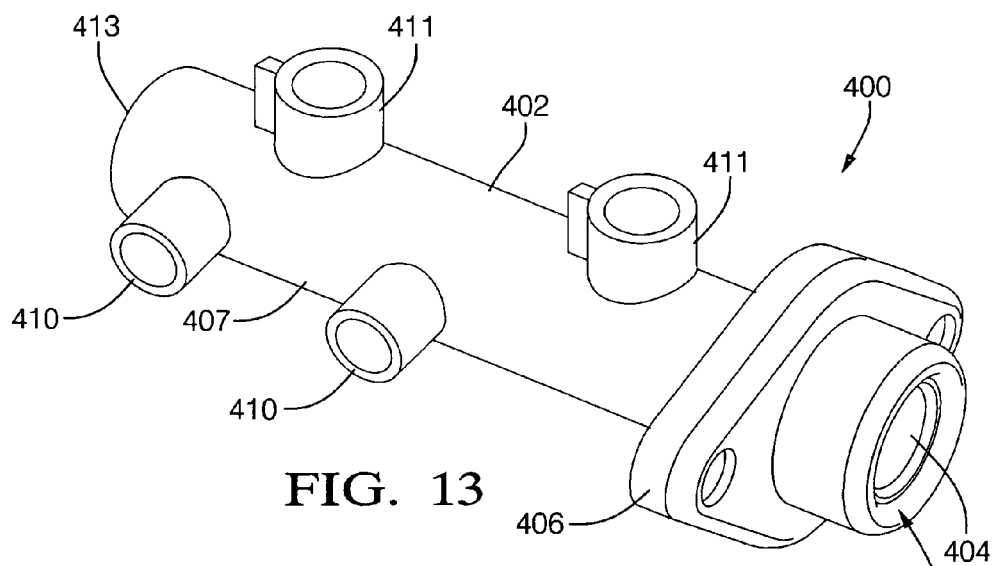
FIG. 13 is a front perspective view of a fifth aspect of the master cylinder housing.
Figure 14:
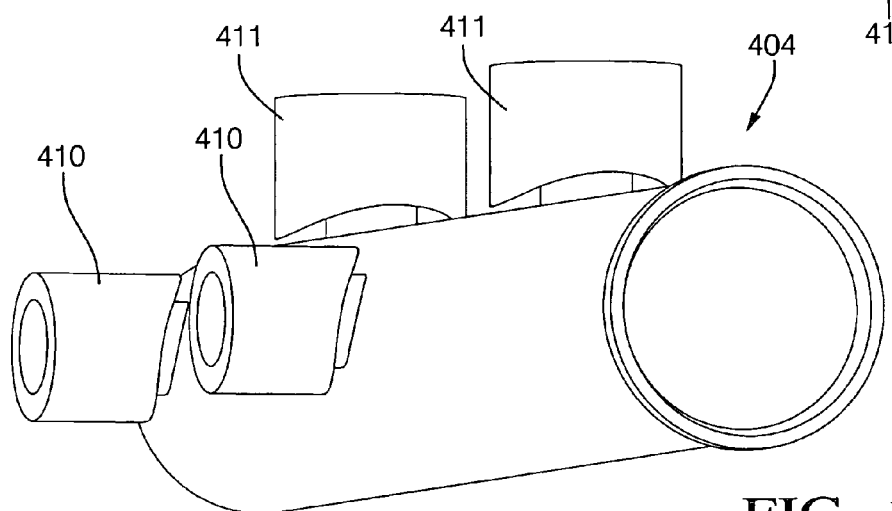
FIG. 14 is a front perspective view of an inner lining of the master cylinder housing of FIG. 13.
Figure 15:
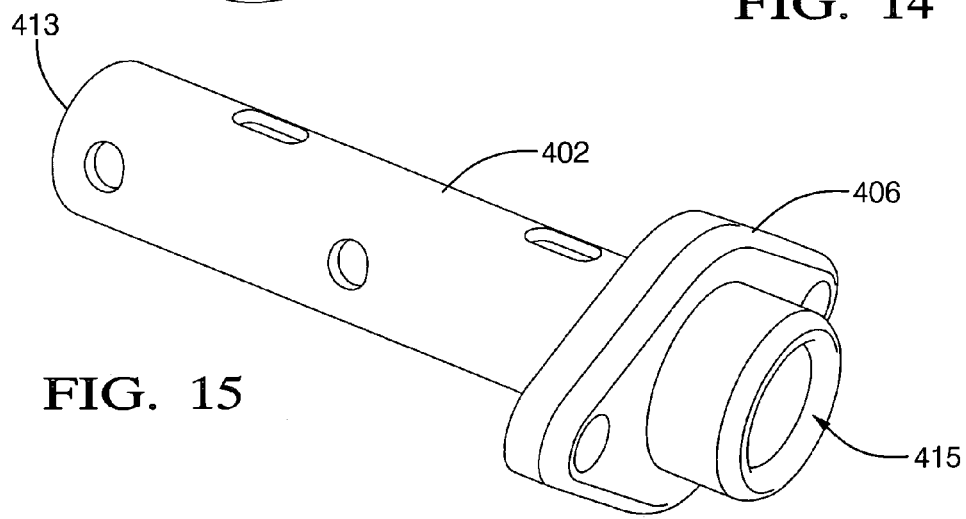
FIG. 15 is a front perspective view of an outer shell of the master cylinder housing of FIG. 13.

As shown in FIGS. 11A-12, a fourth aspect of the master cylinder housing, generally designated 300, includes an outer shell 302 and a body 304.

Body 304 may be made by first forming an impact-extruded body 306 (see FIG. 11B) by any conventional impact extrusion process, as described above, and includes a generally cylindrical portion 303 and a mounting flange 316. Impact-extruded body 306 may be machined as needed in accordance with predetermined criteria to produce a body 304, as generally shown in FIG. 11C. Finished body 304 may include a closed end 313 and an open end 315, as shown in FIG. 11A.

Outer shell 302 may be formed by a conventional bulge-forming process. Bulge-forming is a method of forming parts by expanding a workpiece, such as a tube, from the inside. A pressurized liquid is frequently utilized to exert the necessary force for the expansion. A blank (not shown) may be stretched beyond its yield point to the desired finished part dimensions for outer shell 302 by the application of controlled hydraulic pressure within a pressure chamber (not shown). Advantages of bulge forming include part repeatability and close tolerance consistency. Outer shell 302 may further includes a plurality of port connector fittings 310 and reservoir fittings 311.

A reservoir 318 may be coupled to master cylinder housing 300, as shown in FIGS. 11A-12. Reservoir 318 may be attached by staking outer shell reservoir fitting 311 to the reservoir. Port connector fittings 310 may be coupled to a brake pipe (not shown) of the vehicle braking system by any conventional manner, such as quick-disconnect and threaded connectors.

As shown in FIGS. 13-18, a fifth aspect of the master cylinder housing, generally designated 400, includes an outer shell 402, an inner lining 404 and a mounting flange 406.

Outer shell 402 may be made from metal, such as steel or aluminum tubing, or an alloy that is compatible with hydraulic braking systems. One end 413 of outer shell 402 may be closed off by any conventional means, such as a closed-end drawing or a welded-in end cap. A second end 415 may be open.

Inner lining 404 may be made of a plastic or polymeric material that is compatible with outer shell 402 and hydraulic braking systems. Example plastic materials include, without limitation, nylon and TEFLON (a trademark of E.I DuPont de Nemours & Co., Inc. for a polytetraflouroethylene material). Inner lining 404 may be insert molded into outer shell 402. Insert molding is an injection molding process whereby plastic is injected into a molding cavity (not shown) and around an insert piece (in this case outer shell 402) placed into the molding cavity prior to molding. The result is a single body 407 (see FIG. 13) having outer shell 402 at least partially encapsulated by the plastic of inner lining 404. The insert may be made of metal or another plastic. An advantage of insert molding inner lining 404 to outer shell 402 is that interior surfaces of the inner lining, such as bore surfaces adapted to slidably house a piston 405 (see FIG. 16), are provided in finished form without a need for machining to provide a smooth surface. Inner lining 404 may further include at least one port connector fitting 410 and a pair of reservoir fittings 411 to facilitate attachment of a reservoir 480, as shown in FIG. 16.

Mounting flange 406 provides a means for mounting master cylinder 400 to a vehicle. Mounting flange 406 may be made of aluminum or steel having an alloy that is compatible with outer shell 402 and the vehicle's hydraulic braking system. Mounting flange 406 may be formed by a metal stamping process. The metal stamping process starts with generally flat metal stock. The metal stock is placed between two sides of a die. Pressure is applied to the metal stock by the die, causing the stock to conform to the shape of the die, producing mounting flange 406.

Master cylinder 400 may be assembled by insert molding inner lining 404 within outer shell 402 in the manner discussed above, resulting in body 407 with molded port brake line fittings 410 and reservoir fittings 411. Outer shell 402 is then press-fit into mounting flange 406 by any conventional method, coupling outer shell 402 to mounting flange 406. As shown in FIG. 16, a pair of O-rings 416 may be used to provide a fluid-tight seal between the reservoir 480 and master cylinder housing 400.

A quick-disconnect connector 426 provides an efficient means for coupling a master cylinder housing to a vehicle braking system, as shown in FIG. 17. Connector 426 may be used with any aspects of the master cylinder housing discussed herein, as well as those found in the art.

Figure 18:
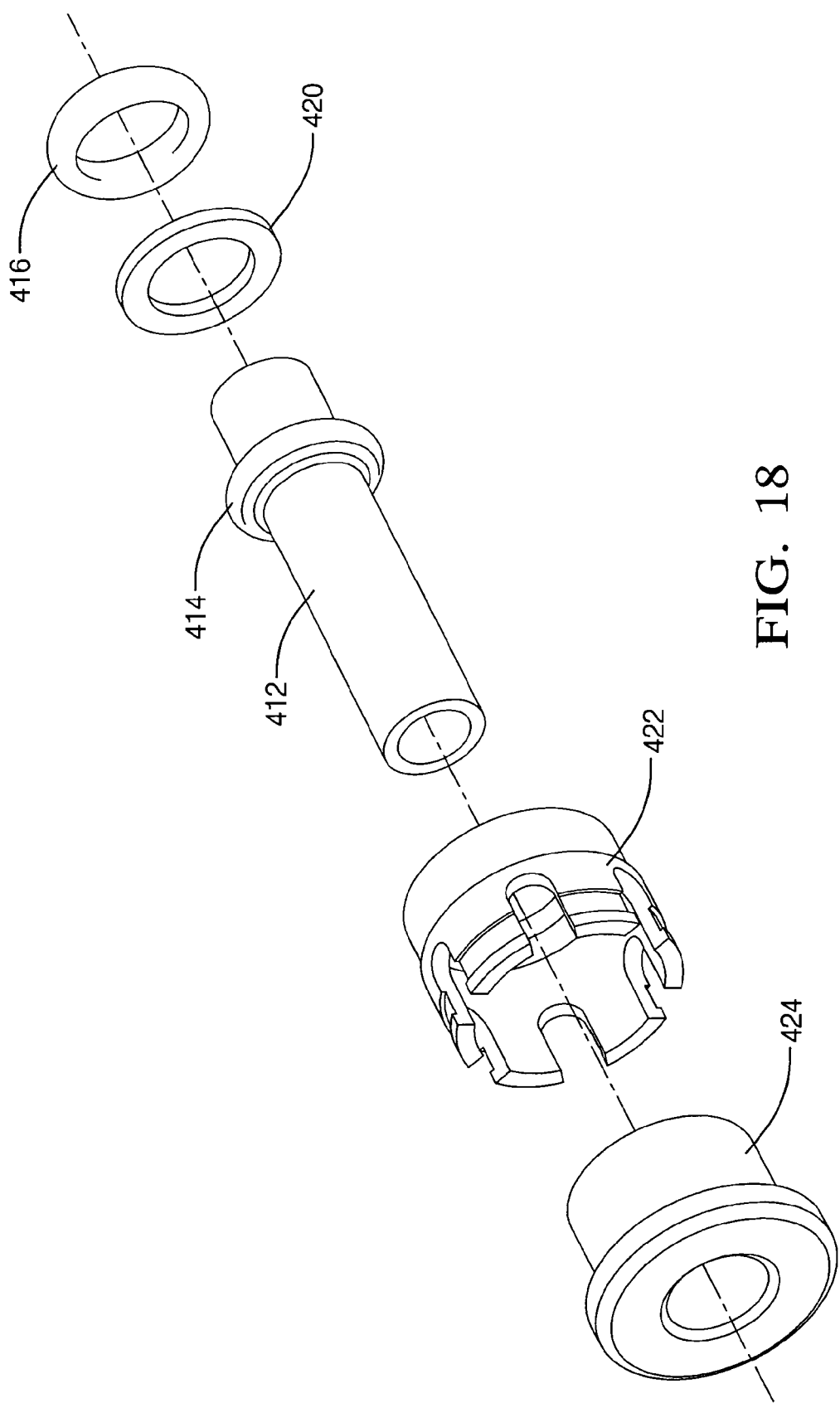
FIG. 18 is an exploded, perspective view of a fitting connector of the master cylinder housing of FIG. 16.

Assembly of connector 426 is shown in FIGS. 17 and 18. An O-ring 416 may be placed into a bore 418 of port connector fitting 410, followed by a backup washer 420. A brake pipe 412, which may include a flare 414, may be inserted into bore 418 until flare 414 contacts backup washer 420. A primary snap-in retainer 422 may be placed over brake pipe 412 and pressed into bore 418 until the primary snap-in retainer comes in contact with flange 414. A secondary snap-in locking retainer 424 may then be placed over brake pipe 412 and pressed into engagement with primary snap-in retainer 422, securing the brake pipe to master cylinder housing 400 and forming a fluid-tight seal.

Although the master cylinder housing is shown and described with respect to certain embodiments, it is obvious that modifications will occur to those skilled in the art upon reading and understanding the specification. The master cylinder housing includes all such modifications and is limited only by the scope of the claims.

What is claimed is:

1. A master cylinder housing comprising:
    an outer shell having an open end and a closed end;
    a polymeric inner lining received within said outer shell;
    a mounting flange extending from said open end of said outer shell; and
    at least one brake line fitting extending from said inner lining, wherein said brake line fitting is connected to said inner lining and extends through said outer shell.

2. The housing of claim 1 wherein said outer shell is formed from a metallic tubing.

3. The housing of claim 1 wherein said outer shell is constructed from a material selected from the group consisting of steel, aluminum and alloys thereof.

4. The housing of claim 1 wherein said inner lining is constructed from a material selected from the group consisting of nylon and polytetrafluoroethylene.

5. The housing of claim 1 wherein said inner lining is insert molded to the outer shell.

6. The housing of claim 1 wherein said inner lining is adapted to slidably receive a piston.

7. The housing of claim 1 further comprising at least one reservoir fitting extending from said inner lining.

8. The housing of claim 7 wherein said reservoir fitting is connected to said inner lining and extends through said outer shell.

9. The housing of claim 1 wherein said outer shell is press-fit into said mounting flange.

10. The housing of claim 1 wherein said mounting flange is made from a material selected from the group consisting of steel, aluminum and alloys thereof.

11. A master cylinder housing comprising:
    an outer shell having a first end, a second end and a generally cylindrical body, said generally cylindrical body defining at least one opening therein; and
    a polymeric inner liner received within said outer shell, said inner liner having at least one brake line fitting extending therefrom,
    wherein said inner lining is connected to said outer shell such that said fitting extends radially from said opening in said outer shell.

12. The housing of claim 11 wherein said outer shell is constructed from a material selected from the group consisting of steel, aluminum and alloys thereof.

13. The housing of claim 11 wherein said inner lining is constructed from a material selected from the group consisting of nylon and polytetrafluoroethylene.

14. The housing of claim 11 wherein said inner lining is insert molded to the outer shell.

15. The housing of claim 11 further comprising at least one reservoir fitting extending from said inner liner.

16. A master cylinder housing comprising:
    an outer shell having an open end and a closed end;
    a polymeric inner lining received within said outer shell; and
    a mounting flange extending from said open end of said outer shell, wherein said outer shell is press-fit into said mounting flange.

* * * * *